Dec. 9, 1952 D. L. HINGS 2,621,291

DEMODULATION SYSTEM

Filed Sept. 6, 1947

INVENTOR.
Donald L. Hings
BY
Stoodling and Kroft
attys

Patented Dec. 9, 1952

2,621,291

UNITED STATES PATENT OFFICE 2,621,291

DEMODULATION SYSTEM

Donald L. Hings, Vancouver, British Columbia, Canada

Application September 6, 1947, Serial No. 772,509

8 Claims. (Cl. 250—20)

My invention relates in general to radio circuits for the elimination of interference noise and in particular to converter or detector systems having noise eliminator circuits.

An object of my invention is to provide an improved carrier wave detection system, and more specifically to the demodulation of only the intelligence on a carrier wave having interference wave energy interposed.

Another object of my invention is to prevent portions of the carrier wave energy being rendered undetectable from impulse wave shock.

Another object of this invention is to obtain a direct current energy proportional to the carrier wave amplitude for automatic volume control purposes which has no response to the interfering wave energy.

A further object of my invention is to modulate a second carrier wave with the intelligence modulation component of a first carrier wave and have the resultant wave devoid of the interfering waves modulating the first carrier wave.

Another object of this invention is to amplitude modulate a second carrier wave from a first carrier wave having either amplitude modulation or frequency modulation.

A still further object of this invention is to demodulate a first carrier wave having either frequency modulation or amplitude modulation and also interposing interference waves and rendering the demodulated energy from the intelligence only.

Other objects and a fuller understanding of my invention may be had by referring to the following description and claims, taken in conjunction with the accompanying drawing, in which:

Figures 1, 2, 3, 4:
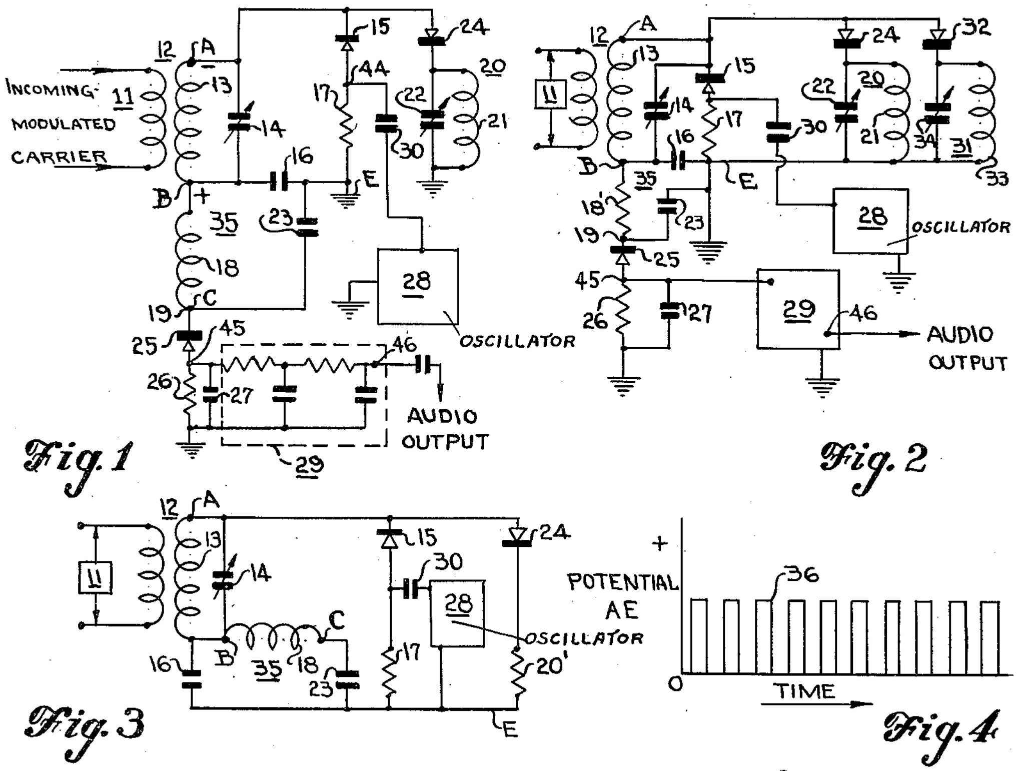
Figure 1 is a schematic diagram of the preferred embodiment of my invention.
Figure 2 is a schematic diagram of a modification of my radio circuit for either frequency or amplitude modulation.
Figure 3 is a schematic diagram of a simplified version of my circuit.
Figure 4 is a graph of incoming carrier frequency square wave voltages on a magnified time scale obtainable from an unmodulated first carrier wave across points AE from the simplified circuit of Figure 3.

The circuit of Figure 1 shows the preferred embodiment of my invention wherein a transformer 12 is subjected to an incoming carrier wave 11. The input transformer 12 has a secondary 13 with a condenser 14 connected across the terminals A and B thereof. A first rectifier 24 and a parallel resonant circuit 20 are connected in series between the upper terminal A of the secondary 13 and ground E. The parallel resonant circuit 20 includes an inductor 21 and a capacitor 22. The first rectifier 24 is connected to unidirectionally pass electron current from the terminal A to ground E. A second rectifier 15 and a first impedance 17 are serially connected between the terminal A and ground E. The second rectifier 15 is connected to unidirectionally pass electron current from ground E to the terminal A. The first impedance 17 has been shown as a resistance. A filter 35 connects the lower terminal B of the secondary 13 to ground E. The filter 35 includes a choke or inductance 18 which is a high frequency impedance, a high frequency bypass condenser 16 and a filter condenser 23. A local oscillator or second carrier wave source 28 is connected through a coupling condenser 30 to a point 44 which joins the second rectifier 15 and the first impedance 17. A detector 25 and detector load resistor 26 are serially connected between the lower terminal C of the choke 18 and ground E. The detector 25 is connected to unidirectionally pass electron current between ground E and the point B. A filter condenser 27 is connected in parallel with the detector load resistor 26. A second carrier filter 29, which offers a high attenuation to the second carrier wave, is connected to point 45 which is the juncture of the detector 25 and the detector load resistor 26. The second carrier filter 29 has an output terminal 46 from which the audio output may be obtained.

The incoming carrier wave 11 may be either a radio frequency or an intermediate frequency wave and I have chosen to illustrate it as an intermediate frequency wave, e. g. 1.5 megacycles. The tank circuit 13—14 will have a high impedance to this incoming first carrier wave and will have a low impedance to waves of other frequencies, including the second carrier wave frequency. The impedance 17 offers an impedance to the second carrier wave frequency to thus bias the rectifier 15 at the second carrier frequency rate. It also offers an impedance to the first carrier wave frequency, but this is not essential to the operation of my circuit. The second carrier wave source 28 must be a lower frequency than the incoming first carrier wave and I have chosen the frequency of the second carrier wave considerably lower than the frequency of the first carrier wave, e. g. in the order of 20 kilocycles. The coupling condenser 30 is merely used for isolation between the second carrier source 28 and the detector circuit proper and is of a value to pass the second carrier wave frequency. The second carrier wave 28 does not heterodyne with the first carrier wave to produce any sum or difference frequency utilized in the load 26, but merely combines with it by amplitude means to provide a periodically varying bias at the second carrier frequency to the rectifier 15. The parallel resonant circuit 20 is tuned slightly off the resonant frequency of the first carrier wave frequency, and hence is a frequency discriminating circuit. The parallel resonant circuit 20 therefore offers a high impedance to waves of a frequency just off one side of the incoming first carrier wave, but presents a much lower impedance to the first carrier wave frequency. The tank circuit 20 therefore offers approximately the same impedance to the first carrier wave as does the impedance 17. The parallel resonant circuit 20 must have a high Q in order to most efficiently perform in my circuit, and I use a parallel resonant circuit 20 having a Q of 150 or better. The filter 35 is shown as a low pass filter, the essential feature being that this filter 35 offers a high impedance or attenuation to the first carrier yet offers a low attenuation to the second carrier.

Figure 5:
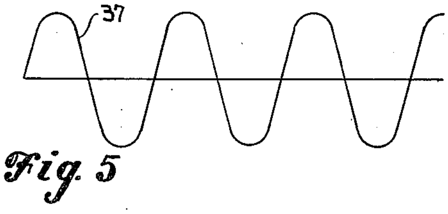
Figure 5 is a graph of an unmodulated second carrier wave.
Figure 6:
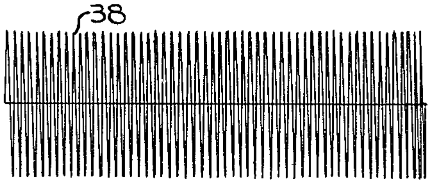
Figure 6 is a graph of an incoming unmodulated first carrier wave.
Figure 7:
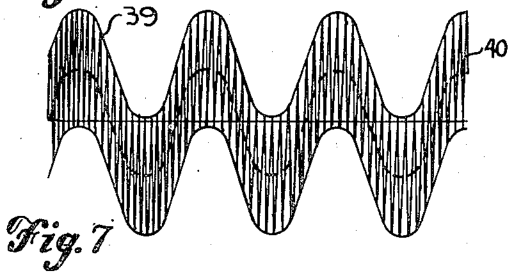
Figure 7 is a graph of the resultant wave of the combination of the waves shown in Figures 5 and 6.

The operation of the circuit of the preferred embodiment of my invention as shown in Figure 1 will be accomplished by referring first to the equivalent or simplified circuit of Figure 3 merely for purposes of explanation. In Figure 3 the tank circuit 20 has been replaced by an impedance 20′. The assumption is made that the impedances 17 and 20′ are of equal low impedance to direct current. If a first carrier wave 11 is impressed upon the input transformer 12, and no voltage applied from voltage source 28, this wave will be rectified in opposite senses by rectifiers 15 and 24, and no voltage will appear across CE. If a direct current potential were to be applied across the impedance 17, e. g., if the voltage source 28 were a direct current source, such that the cathode of rectifier 15 is raised positively in potential, the terminal or conductor A is "unclamped" or released, and square waves 36 at the first carrier frequency are produced across AE. Such square waves 36 are shown in Figure 4 on a magnified time scale and will have a constant amplitude if the first carrier wave is unmodulated. The potential of the square waves 36 varies from ground to a positive value equal to the direct current potential applied across impedance 17. The current through condenser 16 will thereby rise and the axis of this first carrier wave will rise above the ground potential. As the direct current potential across impedance 17 is raised, the efficiency of detection is raised until a point is reached (when the peak voltage of the first carrier equals the direct current voltage across impedance 17) when the rectifier 15 is rendered inoperative, rectifier 24 does all the rectifying, and the efficiency of rectification is at a maximum. Further raising of this direct current potential across impedance 11 leaves the rectification efficiency unchanged at its maximum. The graph of the current 40 through condenser 16 with an unmodulated first carrier wave 11 applied to transformer 12, is shown in Figure 7. An unmodulated second carrier wave 37 is shown in Figure 5, and an unmodulated first carrier wave 38 is shown in Figure 6. Figure 7 shows the resultant wave 39 which is the combination of the first and second carrier waves 37 and 38. The dotted line 40 is the average current or voltage across CE. In this invention the amplitude of the second carrier wave is arranged to be slightly, about ten per cent, less than the average unmodulated first carrier wave amplitude, so that the graph of Figure 7 showing the resultant wave 39 is approximately correct, and the rectification efficiency is almost at a maximum.

Figure 8:
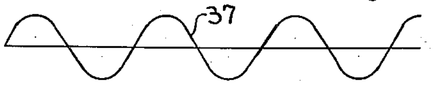
Figure 8 is a graph of the unmodulated second carrier wave drawn to a smaller amplitude scale than the wave of Figure 5.
Figure 9:
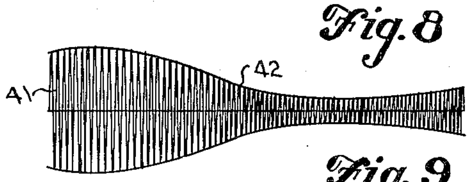
Figure 9 is a graph of a modulated incoming first carrier wave.
Figure 10:
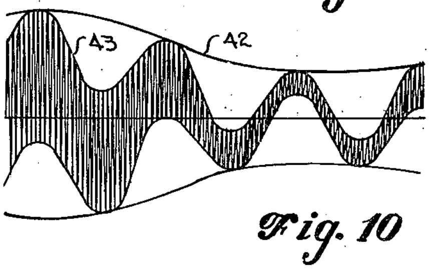
Figure 10 is a graph of the resultant wave of the combination of the waves shown in Figures 8 and 9.

In an amplitude modulated first carrier wave 41, such as is shown in Figure 9, applied to the circuit of Figure 1, the effect of the modulation component 42 is to cause the amplitude of the resultant carrier envelope shown in Figure 10 to vary in time in sympathy with the modulation component 42. Figure 8 shows the second carrier wave 37 with a lower amplitude to correspond with the amplitude scales of Figures 9 and 10, with Figure 10 as the resultant of the waves of Figures 8 and 9. As hereinbefore stated, that the efficiency of rectification is increased as the direct current potential across impedance 17 is raised, it will be seen that the efficiency of detection is low for large ratios of the amplitude of the first carrier to the second carrier wave and vice versa, hence providing amplitude discrimination. Thus, the resultant wave form at CE is the second carrier wave 37 modulated by the modulation envelope 42 originally superposed on the first carrier wave 38, but now limited to a certain maximum percentage of modulation. For example, the original modulation of the first carrier wave may peak at times to ninety per cent, but the modulation now appearing on the resultant wave may not exceed, say forty-five per cent, this figure depending on the ratio of the average first carrier amplitude to second carrier amplitude.

The output at CE is detected in an orthodox manner using rectifier 25 and the detector load 16—17. The second carrier filter 29 offers a high attenuation to the frequency of the second carrier and hence eliminates the second carrier at the audio output terminal 46.

The following theory of operation is advanced as to why my radio circuit improves reception by discriminating against instantaneous large values of carrier which occur when interference is present. The second carrier amplitude is arranged to be a certain fraction of or to have a given ratio relative to the first carrier amplitude and to follow it with a short time constant. An automatic volume control circuit for controlling the amplitude of the second carrier wave 28 may be utilized for this purpose, and such AVC circuit may have the normal time constant of one fourth to one tenth of a second. Thus, the long term efficiency of rectification is adequate, but the short term efficiency occurring at high instantaneous voltages of the first carrier is low, as previously explained. Such high instantaneous amplitudes of the first carrier occur when interference is present. The detector circuit will have the same interference to signal rejection ratio for weak signals, as well as strong signals, not only because for one thing the AVC action of the receiver tends to keep the voltage of the final intermediate frequency stage or incoming first carrier constant, but also because the second carrier wave voltage is arranged to be a certain fraction of the final intermediate frequency voltage. For ordinary speech modulation and most forms of interference such as ignition, etc. the circuit of Figure 3 is equivalent to the actual circuit shown in Figure 1. The circuit of Figure 1 differs from the simplified circuit of Figure 3 only by having a high Q parallel resonant circuit tuned, for example, to about 15 kilocycles either above or below the incoming first carrier in place of resistance 20'. Thus, receiver noise and other high pitched hissing sounds whose frequencies approach 15 kilocycles will produce side bands to one of which the parallel resonant circuit 20 is tuned. At this frequency there is now a high impedance path through rectifier 24 and tank circuit 20 which will in effect raise the rectification efficiency of the combined rectifiers 15 and 24. However, rectifier 15 will rectify this noise and other 15 kilocycle components only during negative half cycles of the second carrier applied across impedance 17, and this will not pass through detector 25 since it is reversedly connected. Thus, having tank circuit 20 detuned from the first carrier frequency is effective in reducing interference hiss and receiver noise from the output.

The rectifiers 15 and 24 and the detector 25 may be anything suitable for the frequency response. In the actual receiver circuit in use, germanium crystals have been used. The rectifiers 15 and 24 may be reversed in polarity if the detector 25 is likewise reversed, which reversing may be desirable to obtain a negative swing for automatic volume control. The circuit as shown in Figure 1 now develops a positive swing in audio output voltage. If the circuit is used to obtain an automatic volume control voltage, such a control voltage is entirely independent of the interference energy present on the first carrier wave and hence makes an ideal control voltage since it is affected by modulation only.

A very desirable feature of this invention is that this circuit works just as well on ten per cent modulation of the first carrier wave as it does with normal modulation. This is in opposition to ordinary limiter circuits that require heavy modulation to be effective. In tuning across the dial a novel result is obtained from this circuit in that no side band hiss is heard at the fringes of the correct tuning for any particular signal frequency. The incoming signal is heard at about the same amplitude completely across the band pass of the set for that station. Between stations, where there is no incoming signal, the receiver is exceptionally quiet with no interference noise of any kind being heard, and this is true because an incoming carrier is required in order to render the detector circuit operative to any material extent.

The reaction of the tuned circuit 20 to noise energy produces a high impedance to the noise energy, and thereby prevents normal rectification of the noise energy, even though it may be of considerably lower amplitude than the carrier energy.

The purpose of the second carrier energy from the local oscillator 28 is to form a differential or amplitude discrimination action with the incoming carrier 11 on the input transformer 12, or in other words, a constantly variable limiting action at the frequency of the second carrier, with the maximum opening depending upon the amplitude of the second carrier and being closed off or limited during the non-rectifying positive half cycle of the second carrier. In the practical application it is desirable that the amplitude of the second carrier be held in relation to the amplitude of the first carrier so that excessive noise peaks caused by complete saturation of the first carrier pre-stage amplifiers, which may last longer than a half cycle of the second carrier do not obliterate the intelligence. In this manner long duration periods of obliterated intelligence caused by excessive interference will not prevent the second carrier wave from being rectified at a relatively normal level by the detector 25, and therefore does prevent heavy noise shocks from appearing in the audio output and/or AVC voltage.

Figure 2 is the same as Figure 1 with the exception of having an additional tuned circuit 31. A third rectifier 32 is serially connected with the parallel resonant circuit 31 between the terminal A of secondary 13 and ground E. The parallel resonant circuit 31 includes an inductor 33 and capacitor 34. The third rectifier 32 is connected to unidirectionally pass electron current from the terminal A to ground E. The second high frequency impedance 18' has been shown as a resistance rather than as an inductance, and either is satisfactory as long as the filter 35 presents a low attenuation to the second carrier and a high attenuation to the first carrier. The tank circuit 31 is tuned to a frequency just off the frequency of the first carrier wave 11, and is tuned closer to the frequency of the first carrier 11 than to the resonant frequency of the tank circuit 20. In practice, the tank circuit 31 is tuned in the order of five kilocycles from the frequency of the first carrier 11.

In operation, the circuit of Figure 2 is able to operate on frequency modulated as well as amplitude modulated waves of the first carrier 11. For operation with frequency modulated waves the tank circuit 31 operates in a similar manner to F. M. discriminators to present a changed impedance to frequency shift and hence detection of the modulation component is achieved. When applying frequency modulation to the first carrier 11, the change in frequency will tend to alter the amount of energy rectified by the close proximity tuned circuit 31 and rectifier 32, and thereby add or subtract according to the swing of the modulation to the effective rectified energy of the detector circuit of transformer 12. In this way the circuit will produce an amplitude modulated carrier at the second carrier frequency, and the output from the detector 25 will be the same for both amplitude and frequency modulations on the incoming carrier 11.

In addition to this, the second tuned circuit 20 and rectifier 24, which has a greater frequency separation than the tuned circuit 31 from the first carrier frequency, will be susceptible to rectification of noise energy, and not carrier energy. This prevents normal rectification during the intervals of noise and effectively neutralizing or cancelling the noise energy rectified in the other tuned circuits.

Although I have shown and described my invention with a certain degree of particularity, it is understood that changes may be made therein without departing from the spirit of the invention which are included within the scope of the claims hereinafter set forth.

What is claimed is:

1. A radio circuit for use with a source of modulated carrier waves, comprising, a first and a second rectifier, a parallel resonant circuit, an impedance, a load, first circuit means for connecting said parallel resonant circuit in series loop circuit relationship with said first rectifier, said load and said carrier wave source and excluding said impedance, alternating current biasing means connected across said impedance, and second circuit means for connecting said impedance in series loop circuit relationship with said second rectifier, said load and said carrier wave source, said first and second rectifiers being oppositely connected relative to said carrier wave source.

2. A radio circuit for use with a source of modulated carrier waves, comprising, a first and a second rectifier, a parallel resonant circuit, a load, first circuit means for connecting said parallel resonant circuit in series loop circuit relationship with said first rectifier, said load and said carrier wave source, second circuit means for connecting in series loop circuit relationship said second rectifier, said load and said carrier wave source, said first and second rectifiers being oppositely connected relative to said carrier wave source, and interrupting means connected in said second circuit means only for selectively rendering said second rectifier alternately operative and nonoperative.

3. A circuit for use with a source of electromagnetic waves at a first frequency and capable of having an intelligence component, comprising, first and second rectifier devices, a parallel resonant circuit capable of resonating at a second frequency, alternating current bias means, a low pass filter, first circuit means for connecting said parallel resonant circuit in series loop circuit relationship with said first rectifier, said low pass filter and said electromagnetic wave source and excluding said alternating current bias means, and second circuit means for connecting said alternating current bias means in series loop circuit relationship with said second rectifier, said low pass filter and said electromagnetic wave source and excluding said parallel resonant circuit, said first and second rectifiers being connected in opposition in relation to said electromagnetic wave source.

4. A converter circuit for use with a source of first electromagnetic waves having an intelligence component and interposed interference energy to convert only said intelligence component by amplitude means to a second electromagnetic wave appearing across a load, said converter circuit comprising a first source of said first electromagnetic waves, a first and a second rectifier, first resonant circuit means having a high impedance to said interference energy and a relatively low impedance to said first electromagnetic wave, second circuit means including an impedance, a load, first connection means for connecting in series loop circuit said first rectifier, said first circuit means, said load and said first source and excluding said second circuit means, second connection means for connecting in series loop circuit said second rectifier, said second circuit means, said load and said first source, a second source of said second electromagnetic waves, and third circuit means for applying energy from said second source to said impedance, said first and second rectifiers being oppositely connected relative to said first source.

5. A demodulation system comprising, a first source of modulated carrier waves, a second source of carrier waves having approximately the same amplitude and a lower frequency than the waves of said first source, a first detector circuit including unilateral means, a first rectifier device, a parallel resonant circuit tuned to a frequency slightly different than the carrier frequency of said first carrier wave source, means for connecting said first carrier wave source, said first rectifier device, said parallel resonant circuit and said first detector circuit in a series loop with said first rectifier device and said unilateral means passing current in the same direction, an impedance, means for energizing said impedance from said second carrier wave source, a second rectifier device, means for serially connecting said second rectifier device with said impedance, and means for connecting said last mentioned series combination in parallel with the series combination of said first rectifier device and said parallel resonant circuit with said first and second rectifier devices conducting in the same direction in the loop formed thereby.

6. A demodulation system comprising, a first source of modulated carrier waves, a second source of carrier waves having approximately the same amplitude and lower frequency than the waves of said first source, a first detector circuit, said first detector circuit including a first rectifier device, a load impedance, and first carrier wave filter means connected in series, a second rectifier device, a parallel resonant circuit tuned to a frequency slightly different than the frequency of the carrier of said first carrier wave source, means for connecting said first carrier wave source, said second rectifier device, said parallel resonant circuit and said first detector circuit in a series loop with said first and second rectifier devices passing current in the same direction, an impedance, means for energizing said impedance from said second carrier wave source, a third rectifier device, means for serially connecting said third rectifier device with said impedance, and means for connecting said last mentioned series combination in parallel with the series combination of said second rectifier device and said parallel resonant circuit with said second and third rectifier devices passing current of said first source in opposite directions.

7. A demodulation system comprising, a first source of modulated carrier waves, a second source of carrier waves having at least the same amplitude as the average of said first carrier wave and having a frequency between the carrier and modulation frequencies, a first detector circuit for detecting the modulation component contained in said first source, said first detector circuit including a first rectifier device, a load impedance, and first carrier wave filter means connected in series, a second rectifier device, a parallel resonant circuit tuned to a frequency slightly different than the carrier frequency of said first carrier wave source, means for connecting said first carrier wave source, said second rectifier device, said parallel resonant circuit and said first detector circuit in series loop circuit relation with said second rectifier device unidirectionally conducting in the same direction as said first rectifier device, an impedance, means for energizing said impedance from said second carrier wave source, a third rectifier device, means for serially connecting said third rectifier device with said impedance, and means for connecting said last mentioned series combination in parallel with the series combination of said second rectifier device and said parallel resonant circuit with said third rectifier device connected for unidirectionally passing said modulated carrier wave in a direction opposite to said first rectifier device.

8. A demodulation system comprising, a first source of modulated carrier waves, a second source of carrier waves having slightly greater amplitude and lower frequency than the waves of said first source, a first detector circuit for detecting the modulation component contained in said first source, said first detector circuit including a first rectifier device, a load impedance, and first carrier wave filter means connected in series, a second rectifier device, a first parallel resonant circuit tuned to a frequency slightly different than the carrier frequency of said first carrier wave source, means for connecting said first carrier wave source, said second rectifier device, said first parallel resonant circuit and said first detector circuit in series loop circuit relation with said first and second rectifier devices being connected in the same sense, an impedance, means for energizing said impedance from said second carrier wave source, a third rectifier device, means for serially connecting said third rectifier device with said impedance, means for connecting said last mentioned series combination in parallel with the series combination of said second rectifier device and said first parallel resonant circuit with said second and third rectifier devices connected so as to form a unidirectionally conducting loop, a fourth rectifier device, a second parallel resonant circuit tuned to a frequency closer to the frequency of said first carrier wave than the resonant frequency of said first parallel resonant circuit, means for serially connecting said fourth rectifier device and said second parallel resonant circuit, and means for connecting said last mentioned series combination in parallel with the series combination of said second rectifier device and said first parallel resonant circuit with said second and fourth rectifier devices being connected in opposition in the loop formed thereby.

DONALD L. HINGS.

REFERENCES CITED

The following references are of record in the file of this patent:

UNITED STATES PATENTS

| Number | Name | Date |
|---|---|---|
| 1,313,070 | Cohen | Aug. 12, 1919 |
| 1,673,002 | Fearing | June 12, 1928 |
| 1,702,001 | Gill et al. | Feb. 12, 1929 |
| 2,087,063 | McCutchen | July 13, 1937 |
| 2,103,878 | Thompson | Dec. 28, 1937 |
| 2,115,876 | Roberts | May 3, 1938 |
| 2,137,475 | Mountjoy | Nov. 22, 1938 |
| 2,363,288 | Bell | Nov. 21, 1944 |
| 2,403,053 | Conklin | July 2, 1946 |
| 2,418,389 | Andresen | Apr. 1, 1947 |
| 2,424,925 | Conrad | July 29, 1947 |
| 2,545,232 | Hings | Mar. 13, 1951 |

FOREIGN PATENTS

| Number | Country | Date |
|---|---|---|
| 172,376 | Great Britain | Nov. 30, 1921 |

OTHER REFERENCES

A Detector Circuit for Reducing Noise in C. W. Reception, by Thompson, Q. S. T., April 1935, pages 38, 39 and 40.

A Detector Circuit for Reducing Noise in Phone Reception, by Thompson, Q. S. T., February 1936, pages 44, 45.